United States Patent
Eden et al.

[11] Patent Number: 5,867,022
[45] Date of Patent: Feb. 2, 1999

[54] INDUCTIVE ANGLE-OF-ROTATION SENSOR HAVING ROTATABLE MAGNETICALLY CONDUCTIVE ELEMENT WITHIN SINGLE WINDING COIL

[75] Inventors: Gerd Eden, Hage; Horst Heinrich, Hanover; Stefan Groetzinger, Gehrden, all of Germany

[73] Assignee: WABCO GmbH, Hanover, Germany

[21] Appl. No.: 822,188
[22] Filed: Mar. 20, 1997

[30] Foreign Application Priority Data

Mar. 23, 1996 [DE] Germany .............. 196 11 488.8
Feb. 22, 1997 [DE] Germany .............. 197 07 122.8

[51] Int. Cl.⁶ .............. G01B 7/30; G01D 5/20
[52] U.S. Cl. .............. 324/207.16; 324/207.22; 324/207.25
[58] Field of Search .............. 324/163, 173, 324/207.15–207.19, 207.22, 207.25; 336/45; 340/870.31–870.33

[56] References Cited

U.S. PATENT DOCUMENTS

| | | | |
|---|---|---|---|
| 3,433,070 | 3/1969 | Grimaldi | 324/173 X |
| 4,406,999 | 9/1983 | Ward | 324/207.16 X |
| 5,455,508 | 10/1995 | Takahashi | 324/207.22 |

FOREIGN PATENT DOCUMENTS

| | | | |
|---|---|---|---|
| AS 1 097 187 | 1/1961 | Germany . | |
| 32 11 425 C 2 | 9/1983 | Germany . | |
| 43 13 273 A 1 | 4/1993 | Germany . | |
| 43 35 594 C 2 | 4/1994 | Germany . | |
| 43 30 540 C 1 | 3/1995 | Germany . | |
| 567091 | 3/1977 | U.S.S.R. | 324/207.25 |

*Primary Examiner*—Gerard Strecker
*Attorney, Agent, or Firm*—Proskauer Rose LLP

[57] ABSTRACT

An angle-of-rotation sensor comprises a coil, a magnetically conductive element within the coil which is rotatable around an axis of rotation, the axis of rotation of the magnetically conductive element being at least partially within the coil, and a single winding for the coil. The angle-of-rotation of the magnetically conductive element is determined by measuring the change in self-inductance in the coil when the magnetically conductive element is caused to rotate.

15 Claims, 3 Drawing Sheets

SECTIONAL PLANE A

INDUCTIVE ANGLE-OF-ROTATION SENSOR HAVING ROTATABLE MAGNETICALLY CONDUCTIVE ELEMENT WITHIN SINGLE WINDING COIL

BACKGROUND OF THE INVENTION

The instant invention relates to an inductive angle-of-rotation sensor in which a rotatable magnetically conductive element is positioned within a coil body.

An angle-of-rotation sensor of this type is known from DE 43 35 594 A1 (U.S. Pat. No. 5,455,508).

This known angle-of-rotation sensor operates on the principle that a variation takes place in the ratio of the inductances of two windings which are wound on a coil body as a result of rotation of a magnetic conductive element mounted rotatably within the coil body. An arrangement of this type can thus be compared to a transformer with a variable degree of coupling.

In order to produce a signal characterizing the angle of rotation, a.c. voltage is fed into the first coil winding in this known angle-of-rotation sensor. This a.c. voltage induces a certain output voltage in the second coil winding which is a function of the inductance ratio of the two coil windings, and also a function of the angular position of the magnetic conductive element. The ratio between the amplitude of this output voltage and the amplitude of the input voltage fed into the first coil winding therefore represents a measure of the sensed angle of rotation of the magnetic conductive element.

The disadvantage of this principle of operation is that in order to operate the angle-of-rotation sensor, a high-frequency a.c. voltage signal is required, the form of which is sinusoidal. However, sensors of this type are normally used in combination with electronic systems carrying out the evaluation of the sensor signals. Such, electronic systems are at this time almost always based on digital technology. Since these systems usually are also equipped with a microprocessor for the control of other functions in addition to the evaluation of signals from a sensor, it is desirable to operate sensors of such systems with signals that are commonly used in digital electronic systems having microprocessors. A sinusoidal a.c. voltage is not such a signal.

Operation of the known angle-of-rotation sensor with a rectangular a.c. voltage signal normally used in digital technology would have the disadvantage that the harmonics accompanying such a signal may cause undesirable and sometimes unexpected resonance effects which could result in a deterioration of the electronic system with respect to its electromagnetic compatibility with other electronic systems.

Another disadvantage of the operating principle of the known angle-of-rotation sensor is the fact that the output signal carried in the second coil winding is also an a.c. voltage signal. Since it is necessary for the sensing of the angle-of-rotation sensor to measure the amplitude of the output signal, it is necessary in a digital electronic system to transform this output signal by means of a rectifier, and possibly by means of an amplifier as well, into a d.c. voltage signal of suitable magnitude. In this case, the d.c. voltage signal must be of a magnitude which can be processed by an analog/digital converter. Electronic circuit components such as rectifiers, amplifiers and analog/digital converters are expensive components and should therefore be avoided, if possible.

In addition to the above-mentioned disadvantages, the known angle-of-rotation sensor has the additional disadvantage that because two coil windings are employed, at least three but usually even four electrical connections are necessary. A suitable plug-in connector for the connection of such an angle-of-rotation sensor requires therefore at least three and possibly even four electrical contacts. For many applications, however, it is advantageous to use sensors with as few electrical connections as possible.

It is therefore the object of the present invention to provide an inductive angle-of-rotation sensor in a simplified form, with as few electrical connections as possible, which could furthermore be used in a digital electronic system, preferably, in a digital electronic system which includes a microprocessor, and without using analog circuit means.

Analog circuit means are understood in this context to be electronic circuit means suited exclusively or especially for the processing of analog signals, and includes, e.g., rectifier, analog/digital converter, analog amplifier, sinoid generator, etc.

SUMMARY OF THE INVENTION

In accordance with the present invention, an angle-of-rotation sensor comprises a coil, a magnetically conductive element within the coil which is rotatable around an axis of rotation, the axis of rotation of the magnetically conductive element being at least partially within the coil, and a single winding for the coil. The angle of rotation of the magnetically conductive element is determined by measuring the change in self-inductance in the coil when the magnetically conductive element is caused to rotate.

An advantage of this invention is the fact that only a single winding is employed. Therefore, the angle-of-rotation sensor according to the invention requires only two connections. In using a coil with only one winding, the operating principle in the angle-of-rotation sensor according to the invention is based on changing the coil's own inductance (self-inductance) by changing the angle of rotation which is to be sensed. Thanks to this characteristic, the angle-of-rotation sensor is particularly well suited for connection to a digital electronic system, preferably a system with a microprocessor, whereby only very few additional circuit means are needed.

An embodiment of such additional circuit means as well as appertaining evaluation processes suitable for the angle-of-rotation sensor according to the invention are shown in DE 43 13 273 A1. A suitable evaluation process is therefore discussed only briefly here.

A suitable evaluation process consists in feeding a rectangular pulse from a microprocessor into the coil of the angle-of-rotation sensor. With an appropriate selection of circuit means, the coil's self-inductance can be determined from the duration of the pulse decay to a threshold value. Circuits which detect changes in inductance and convert such changes into useful output signals, such as time measurements, are well known in the art. See, e.g., DE 43 35 594 A1 (U.S. Pat. No. 5,455,508) and DE 43 13 273 A1, which are incorporated herein by reference. The angle of rotation to be sensed may thus determined by means of a time measurement. An evaluation method of this type is especially advantageous because a microprocessor is especially well suited to measure time differences as well as to produce rectangular pulses.

In an advantageous further development, the coil is surrounded at least in part by a magnetically conductive material. The magnetically conductive material is placed to special advantage if it is arranged vertically or near vertically to the longitudinal axis of the coil. It is also advantageous to place the magnetically conductive material parallel or nearly parallel to the longitudinal axis of the coil. A combination of these two possibilities is also advantageous. Any of these measures decreases the magnetic resistance which the magnetic flux through the coil must overcome. Thereby, the sensitivity of the angle-of-rotation sensor is increased.

In another advantageous further development, at least part of the magnetically conductive material is located in at least one of the end zones of the coil. The end zones of the coil are here considered to be the open areas of the coil which are not surrounded by turns of the coil winding. This makes it possible to change the distance between the magnetically conductive element and the magnetically conductive material from a very small value to a comparatively very large value by changing the angle of rotation. The sensitivity of the angle-of-rotation sensor is thereby further increased, in particular through further reduction of the magnetic resistance, by small changes of the angle of rotation.

In an especially advantageous embodiment, the magnetically conductive element is designed so that its thickness is minimal in comparison to its length. This simplifies the manufacture of the magnetically conductive element in an especially favorable manner. The magnetically conductive element may be produced, e.g., by stamping it out of a plate of sheet metal.

In another advantageous embodiment, the magnetically conductive element is mounted so that it can be rotated around its axis of rotation into any desired angular position, i.e., it is freely rotatable. This means that the magnetically conductive element is not subjected to any mechanical limitation, and a complete revolution through 360° is possible. As a result, damage due to improper use of the angle-of-rotation sensor is avoided. Another advantage of this embodiment is the fact that the angle-of-rotation sensor can be mounted easily in different mounting positions.

In another further development, the magnetically conductive element is attached to a shaft which is rotatable around the axis of rotation. Such a shaft can be used directly for the determination of the angle of rotation by connecting it mechanically to a sensing element. The magnetically conductive element can be attached to the shaft, e.g., by welding, soldering, bonding or screwing. It is however also possible to make the shaft in the form of an extruded plastic part in such manner that it contains the magnetically conductive element interlockingly.

In another advantageous further development, the magnetically conductive element is rectangular or square shaped in form. Thereby, it is possible, with a suitable arrangement within the coil, to achieve further reduction of the magnetic resistance, and thereby an increase in sensitivity of the angle-of-rotation sensor, if the outer contour of the magnetically conductive element is parallel or nearly parallel with the part of the magnetically conductive material which is located in at least one of the end zones of the coil.

In an advantageous further development, the coil is constructed in box shape with a rectangular or square cross-section. In contrast to the usual cylindrical design of a coil, this design has the advantage that an adaptation to the form of the magnetically conductive element is possible if the latter also has a rectangular or square form. In such case, the inside of the coil can be filled in major part with the magnetically conductive element without mechanically limiting the rotational movement of the magnetically conductive element.

In another advantageous further development, the coil is located within another coil which also has a single winding. The magnetically conductive element is then located within both coils. By rotating the magnetically conductive element around its axis of rotation, the self-inductance of each of the coils is changed. Thereby, it is possible to render the same angle of rotation value accessible via different electric circuits to different electronic systems, even where the electric circuits are separated galvanically from each other. Thereby, several electronic systems can detect the same angle of rotation independently of each other.

In another advantageous further development, the magnetically conductive element is provided with a special cross-sectional contour. In this embodiment, the magnetically conductive element is in the form of a sector of a rotationally symmetrical body, the symmetry axis of which is substantially parallel to the axis of rotation of the magnetically conductive element. In principle, the rotationally symmetrical body can be of any desired inside or outside contour, i.e., a hollow body or a body with any curved contour may be used.

In an especially advantageous embodiment of this development, the magnetically conductive element comprises a sector of a circular cylinder or a truncated cone. Magnetically conductive elements of these shapes are easy to produce.

In yet another advantageous further development, the part of the magnetically conductive material in the end zones of the coil has a face of substantially straight contour facing toward the axis of rotation of the magnetically conductive element. When this feature is combined with the magnetically conductive element being in the form of a sector of a circular cylinder or a truncated cone, an overlapping occurs between the magnetically conductive element and this face when the magnetically conductive element is rotated by a given angle of rotation. The overlapping area depends in an essentially linear manner on the angle of rotation. The magnetic flux through the coil is preferably transmitted through this overlapping area where the magnetic resistance is particularly weak.

Thanks to the above-described design of the magnetically conductive element and this part of the magnetically conductive material, it is possible to obtain a linear dependency of the inductance of the angle of rotation sensor on the overlapping area which, in turn, is linearly dependent on the angle of rotation. This is desirable in many applications.

Furthermore, in certain angular positions which are defined as zero positions and in which the magnetically conductive element does not form an overlapping area with this part of the magnetically conductive material, it is possible to obtain a very strong magnetic resistance as compared with other angular positions, and thereby an especially low inductance of the angle-of-rotation sensor. In this manner it is possible to achieve an especially wide range of values of the inductance, and thereby a good resolution of the measured angular values to be sensed.

BRIEF DESCRIPTION OF THE DRAWINGS

The invention is explained in further detail through illustrative embodiments with the help of the drawings, wherein.

DETAILED DESCRIPTION OF PREFERRED EMBODIMENTS

In FIGS. 1 to 4 the same references numerals are used for parts having comparable functions.

Figure 1:
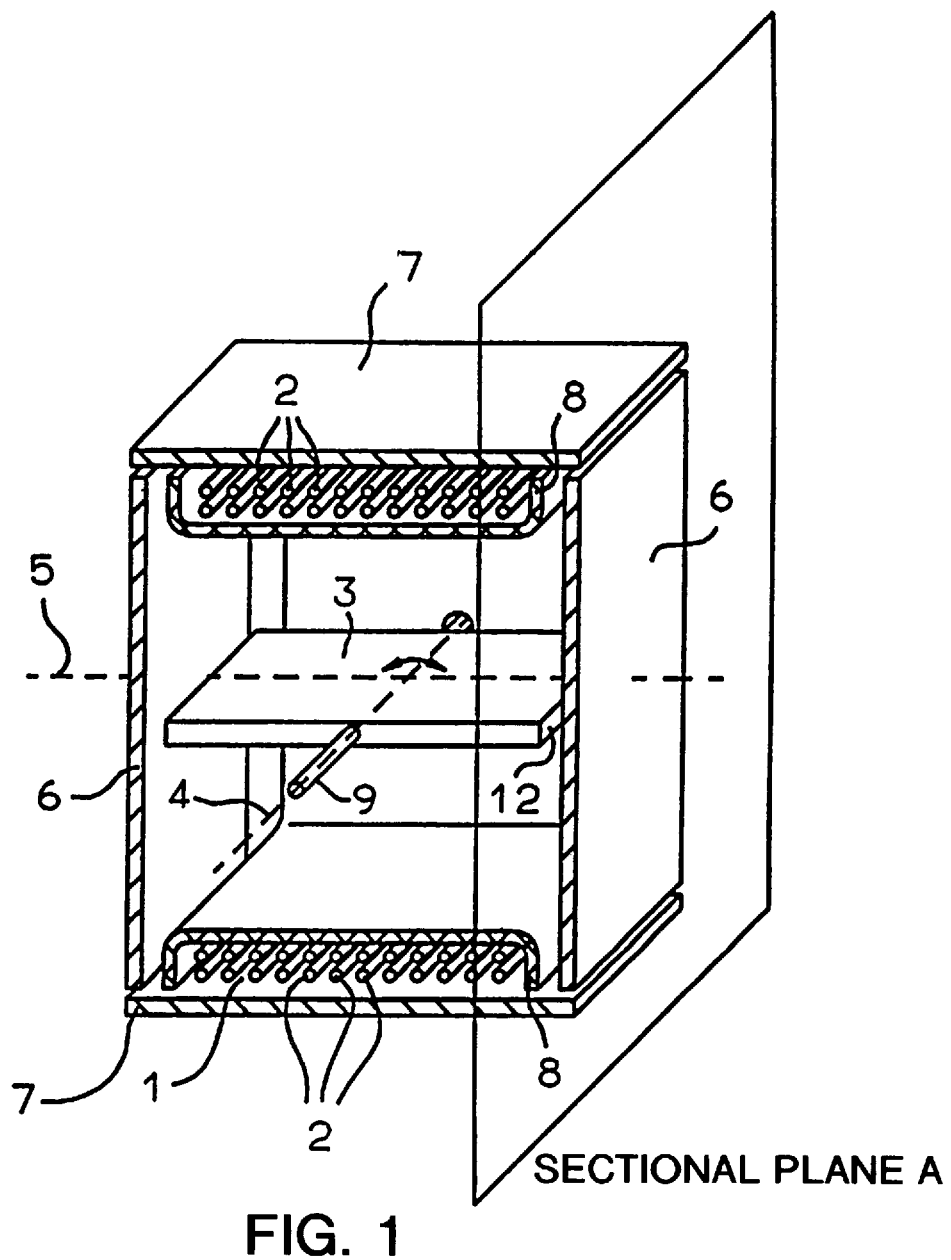
FIG. 1 shows in perspective a sectional view of a first embodiment of the inventive angle-of-rotation sensor, a sectional plane A perpendicular to the axis of rotation of the magnetically conductive element also being shown.

FIG. 1 shows an embodiment of the angle-of-rotation sensor according to the invention having a coil (1) provided with turns (2). The turns (2), which may consist of varnished wire, for example, are wound around a coil body (8) in a preferred embodiment. It is, however, not absolutely necessary for the operation of the angle-of-rotation sensor that a coil body (8) be used. The coil body (8) is preferably made of a material which is not magnetically conductive, such as polyamide (nylon). The turns (2) may consist of a single wire wound around the coil body (8) numerous times. However, the turns (2) may also consist of several wires connected in series located, e.g., in several chambers of the coil body (8) adjoining each other. In either case, the turns (2) form a single winding for coil (1) and for this reason it has only two electrical connections which are however not shown in FIG. 1. The coil (1) also has a longitudinal axis (5).

Within the coil (1) is a magnetically conductive element (3) consisting of a magnetically conductive material such as, e.g., relay material according to German Specification DIN 17405. The magnetically conductive element (3) is freely rotatable around Ean axis of rotation (4). The magnetically conductive element (3) is mounted on a shaft (9) which is connected to an object to be measured (not shown), and allows for the mechanical transmission of the rotational movement of the object to be measured. The longitudinal axis of the shaft (9) corresponds in this case to the axis of rotation (4) of the magnetically conductive element (3). This arrangement may be used to measure the steering angle of a vehicle, for example.

To improve the sensitivity of the angle-of-rotation sensor, the arrangement described above is surrounded on several sides by magnetically conductive material (6, 7). The magnetically conductive material (6, 7) serves to reduce the magnetic resistance which the magnetic flux must overcome. The same material which is used for the magnetically conductive element (3) can also be used for the magnetically conductive material (6, 7).

The magnetically conductive material (6, 7) may be made of sections of sheet metal, for example. In that case, two identical sections (6) of sheet metal are assembled vertically or nearly vertically to the longitudinal axis (5) in each end zone of the coil (1). Two additional identical sections (7) of sheet metal are assembled parallel or nearly parallel to the longitudinal axis (5) of the coil (1). The sections of sheet metal (6, 7) thus form a closed or nearly closed box-shaped arrangement with little magnetic resistance. Depending on the design of the angle-of-rotation sensor, the sheet metal pieces (6) may also have a form different from that of the sheet metal pieces (7). It is of course also possible to make the magnetically conductive material (6, 7) of only one piece of sheet metal bent at an angle.

The angle-of-rotation sensor according to the invention functions in the following manner.

It should first be assumed that the magnetically conductive element (3) is in its zero position as shown in FIG. 1. In this position, the distance between the magnetically conductive element (3) and the magnetically conductive material (6) is at its minimum value. The magnetic flux is able to cover nearly its entire distance within a material having high magnetic conductivity when the magnetically conductive element (3) is in this position by passing through the magnetically conductive element (3) as well as through the pieces of sheet metal (6) and (7). Only a small portion of the magnetic flux passes through the medium surrounding the angle-of-rotation sensor, e.g., air, which generally has little magnetic conductivity. The magnetic resistance of the magnetic circuit is therefore low in this position. As a result, the inductance of the angle-of-rotation sensor is high.

By rotating the shaft (9) in any direction, the angular position of the magnetically conductive element (3) changes correspondingly. At the same time, the distance between the magnetically conductive element (3) and the sheet metal pieces (6) increases. Thereby, the distance which the magnetic flux must cover in the medium with low magnetic conductivity which surrounds the angle-of-rotation sensor (air) increases. As a result, the magnetic resistance of the magnetic circuit increases and the inductance of the angle-of-rotation sensor decreases.

The inductance reaches its lowest value at an angular position of 90 degrees, with the zero position as a base. As the angle of rotation increases beyond 90 degrees, the inductance increases again to its greatest possible value which is reached at an angular position of 180 degrees. This sequence of events is repeated after every additional half revolution of the shaft (9) or of the magnetically conductive element (3).

Figure 2:
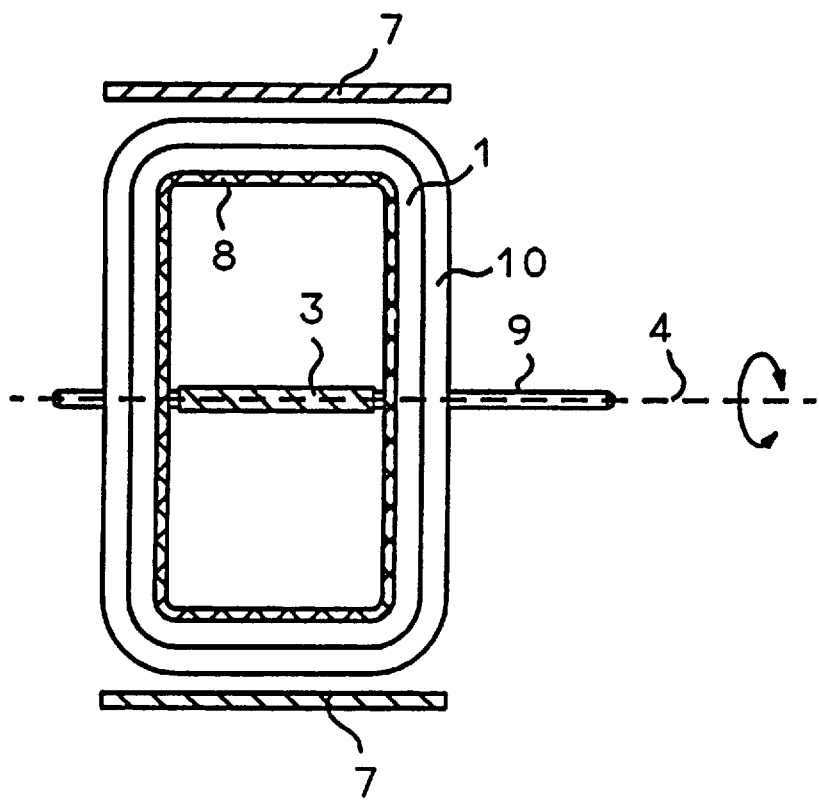
FIG. 2 shows a sectional view of the angle-of-rotation sensor of FIG. 1 taken along plane A of FIG. 1.

FIG. 2 shows a section through the angle-of-rotation sensor of FIG. 1 taken along sectional plane A of FIG. 1. In FIG. 2, the individual turns (2) of the coil (1) are not shown. The sheet metal pieces (6) have also not been shown for the sake of simplification of the drawing.

FIG. 2, in addition to the parts of the angle-of-rotation sensor shown in FIG. 1, also shows an additional coil (10) for the production of an additional angle of rotation signal which is galvanically distinct from the angle of rotation signal of the coil (1). The additional coil (10) is also provided with single winding (not shown) which consists of turns wound around either an additional coil body or directly around the coil (1). Instead of the additional coil body, it is also possible to provide a different material which is not magnetically conductive between the coils (1, 10). In every case, however, the coil (1) is located within the coil (10). The change in inductance of each of the coils' (1, 10) self-inductance is obtained through a change of the angular position of the single magnetically conductive element (3). No additional magnetically conductive element is needed.

In principle, the magnetically conductive element (3) can have any shape. However, it is advantageous for the magnetically conductive element (3) to have such a shape that for a given angular position, e.g., in the horizontal position shown in FIG. 1, the distance between it and the magnetically conductive material (6) is as short as possible. It is therefore especially advantageous to make the magnetically conductive element (3) in the form of a flat piece of sheet metal with a rectangular contour. The magnetically conductive element (3) may also be formed of several thin pieces of sheet metal in order to reduce eddy currents.

One type of arrangement of the magnetically conductive element (3) on the shaft (9) is shown in FIGS. 1 and 2. In another type of arrangement, the magnetically conductive element (3) is mounted on the shaft (9) at a right angle to the position shown in FIGS. 1 and 2. In that case, it is advantageous to round off the surfaces (12) of the magnetically conductive element (3) facing towards the sheet metal pieces (6).

The coil (1) may be of any desired cross-section. However, it is especially advantageous to adapt the cross-section of the coil (1) to the contour of the magnetically conductive element (3). When using a magnetically conductive element (3) with a rectangular contour, it is therefore advantageous if the coil (1) is box-shaped with a rectangular cross-section. In this manner, an especially compact design of the angle-of-rotation sensor together with especially good sensitivity can be attained. By placing the shaft (9) in the central area of the coil (1), and by providing for a symmetric arrangement of the magnetically conductive element (3) on the shaft (9), it becomes possible to rotate the magnetically conductive element (3) by means of the shaft (9) to any desired angle of rotation without mechanical restriction of this rotational movement by parts of the angle-of-rotation sensor.

Figure 3:
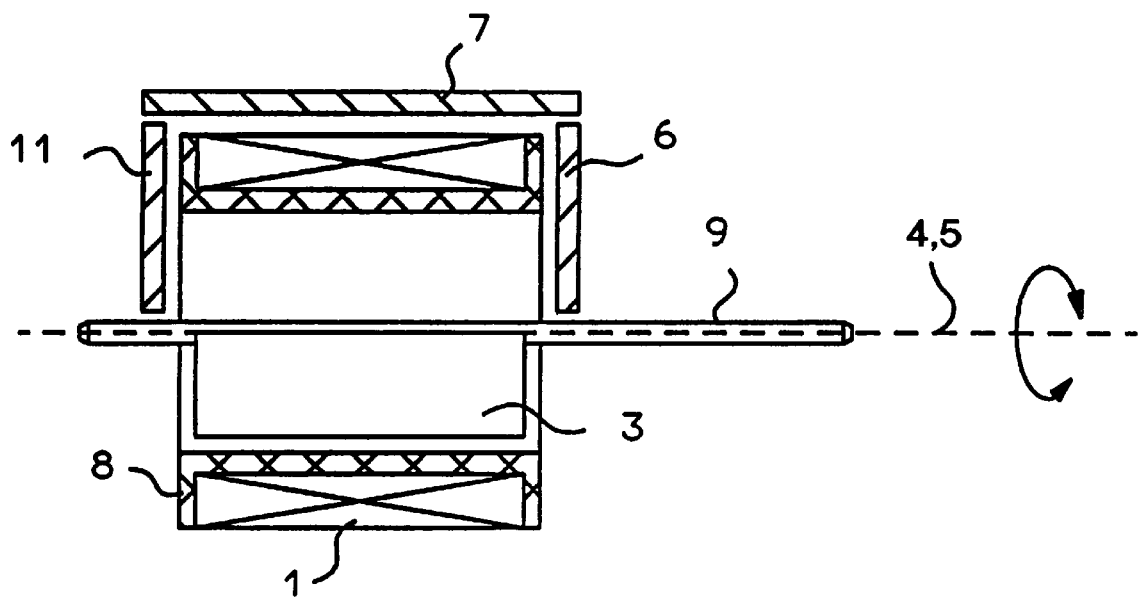
FIG. 3 shows a sectional view of a second embodiment of the inventive angle-of-rotation sensor.

The embodiment of the angle-of-rotation sensor which is shown in FIG. 3 is also provided with a coil (1) which is wound on a coil body (8), a magnetically conductive element (3) attached to a shaft (9), as well as sheet metal pieces (6, 7) made of a magnetically conductive material, just as the embodiment according to FIGS. 1 and 2. The shaft (9) is also rotatable around the axis of rotation (4). The turns (2) of the coil (1) are not shown in FIG. 3.

Contrary to the embodiment of the angle-of-rotation sensor shown in FIG. 1, the axis of rotation (4) of the magnetically conductive element (3) of the embodiment shown in FIG. 3 is parallel or nearly parallel with the longitudinal axis (5) of the coil (1). The axis of rotation (4) may of course also coincide precisely with the longitudinal axis (5) as shown in FIG. 3. In addition to the other parts of the embodiment shown in FIGS. 1 and 2, this embodiment is also provided with a magnetically conductive part (11) which is located in an end zone of the magnetically conductive element (3), i.e., beyond the turns of the winding. The magnetically conductive part (11) is attached on the coil body (8) for instance, in such manner as to be unable to move relative to the coil (1). The magnetically conductive part (11) can be in the form of a flat piece of sheet metal just as the magnetically conductive material (6, 7). It is also possible to make the sheet metal pieces (6, 7, 11) all in one piece, e.g., in the form of an angled piece of sheet metal.

Figure 4:
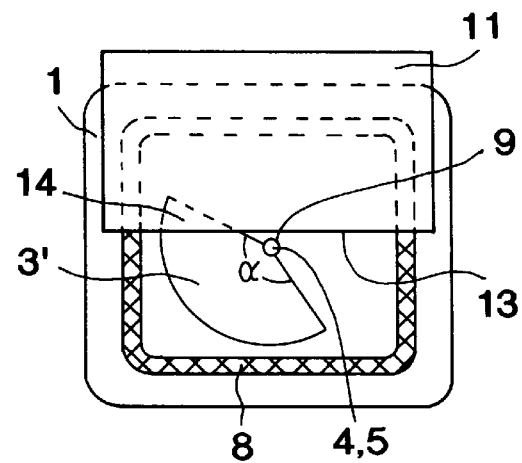
FIG. 4 shows a view of a third embodiment of the inventive angle-of-rotation sensor.

While the magnetically conductive material (6, 7) can be omitted in any embodiment of the invention, the similarly shaped magnetically conductive part (11) is required at least in the embodiments according to FIGS. 3 and 4. The magnetically conductive part (11) has to be arranged in a certain manner near the magnetically conductive element (3) in order to provide an area where the magnetically conductive element (3) and the magnetically conductive part (11) at least partly overlap.

In the embodiment shown in FIG. 3, a change takes place in the magnetic resistance which the magnetic flux through the coil (1) must overcome, also by changing the angular position of the magnetically conductive element (3) by means of the shaft (9). A rotation of the shaft (9) changes the distance between the magnetically conductive element (3) and the sheet metal pieces (6, 11). Starting with the angular position of the magnetically conductive element (3) as shown in FIG. 3, where the magnetically conductive element (3) is completely outside of the space surrounded by the sheet metal pieces (6, 7, 11), a rotation of the shaft (9) reduces the above-mentioned distance and the magnetically conductive element (3) passes into the space surrounded by the sheet metal pieces (6, 7, 11). Thereby, the magnetically conductive element (3) overlaps at least in part the sheet metal pieces (6, 7) in the direction of the magnetic flux.

Following half a revolution of the shaft (9), the magnetic resistance reaches its lowest value and the angle-of-rotation sensor's self-inductance reaches its maximum value.

By selecting a suitable cross-sectional contour for the magnetically conductive element (3), e.g., as a semi-circle or a rectangle, the characteristic function of the angle-of-rotation sensor can be adapted to the applicable requirements.

FIG. 4 shows such a suitable cross-sectional contour of the magnetically conductive element (3'), as well as the corresponding arrangement of the magnetically conductive part (11), by means of which an especially wide range of values of the inductance of the angle-of-rotation sensor, and furthermore also an essentially linear dependency of the inductance on the angle of rotation, can be achieved.

In the embodiment illustrated in FIG. 4, the magnetically conductive element (3') is in the form of a sector of a circular cylinder. The face (13) of the magnetically conductive part (11) facing towards the axis of rotation (4) has a straight contour. A linear dependency of the angle-of-rotation sensor on the angle of rotation is achieved through the essentially linear dependency of the overlapping area (14) which is formed between the magnetically conductive element (3') and the magnetically conductive part (11).

In order to achieve as wide a range of measured values as possible for the inductance, it is desirable to minimize the overlapping area (14) as much as possible for at least one angular position of the magnetically conductive element, or even to avoid overlap entirely. Therefore, the opening angle ($\alpha$) of the cylindrical sector (3') in this embodiment is smaller than or equal to 180°.

It is furthermore possible to provide the magnetically conductive part (11) with two faces (13) at an angle to each other and, if necessary, to enlarge the opening angle ($\alpha$) of the cylindrical sector (3'). In this case, the opening angle ($\alpha$) and the angle between the faces (13) must be adapted to each other in such manner that for one given angular position of the cylindrical sector (3'), an overlap between the magnetically conductive element and the magnetically conductive part (11) is avoided.

When a semi-cylinder is used as the magnetically conductive element (3') in combination with a magnetically conductive part (11) with a straight contour, it is advantageous to place the axis of rotation (4) outside the area covered by the magnetically conductive part (11), as illustrated in FIG. 4. Thereby, an overlap between the magnetically conductive element (3') and the magnetically conductive part (11) can be avoided entirely in a given angular position.

While the invention has been described by reference to specific embodiments, this was for purposes of illustration only. Numerous alternative embodiments will be apparent to those skilled in the art and are considered to be within the scope of the invention.

We claim:

1. An angle-of-rotation sensor, comprising:
   a coil having a longitudinal axis,
   a magnetically conductive element within said coil, said magnetically conductive element being rotatable about an axis of rotation, the axis of rotation of said magnetically conductive element being at least partially within said coil, and
   a single winding for said coil,
   wherein said axis of rotation of said magnetically conductive element is substantially parallel to said longitudinal axis of said coil, wherein said coil has end zones beyond said single-winding, and a magnetically conductive material is mounted on said coil in one of said end zones and is immobile relative to said coil, wherein said magnetically conductive element comprises a sector of a rotationally symmetrical body, said rotationally symmetrical body having an axis of symmetry which is substantially parallel to said axis of rotation of said magnetically conductive element, wherein said magnetically conductive element and said magnetically conductive material form an overlapping area which depends on the angular position of said magnetically conductive element so that in certain angular positions said overlapping area is at a maximum while in other angular positions said overlapping area is at a minimum, wherein the angle-of-rotation of said magnetically conductive element is determined from the change in self-inductance in said coil when said magnetically conductive element is caused to rotate.

2. The angle-of-rotation sensor of claim 1 wherein said magnetically conductive material at least partly surrounds said coil, at least a part of said magnetically conductive material being substantially perpendicular to said longitudinal axis of said coil.

3. The angle-of-rotation sensor of claim 2 wherein said coil has end zones beyond said single winding, and wherein at least a part of said magnetically conductive material is located in at least one of said end zones.

4. The angle-of-rotation sensor of claim 1 wherein said magnetically conductive material at least partly surrounds said coil, at least a part of said magnetically conductive material being substantially parallel to said longitudinal axis of said coil.

5. The angle-of-rotation sensor of claim 4 wherein said coil has end zones beyond said single winding, and wherein at least a part of said magnetically conductive material is located in at least one of said end zones.

6. The angle-of-rotation sensor of claim 1 wherein said coil is box-shaped and has a rectangular cross section.

7. The angle-of-rotation sensor of claim 1 wherein said coil is box-shaped and has a square cross section.

8. The angle-of-rotation sensor of claim 1 further comprising a coil body around which said single winding is wound.

9. The angle-of-rotation sensor of claim 1 wherein said rotationally symmetrical body comprises a circular cylinder.

10. The angle-of-rotation sensor of claim 1 wherein said rotationally symmetrical body comprises a truncated cone.

11. The angle-of-rotation sensor of claim 1 wherein said magnetically conductive element comprises a semi-cylinder having a longitudinal axis which is substantially parallel to said axis of rotation.

12. The angle-of-rotation sensor of claim 1 wherein said coil has end zones beyond said single winding and a magnetically conductive material is mounted on said coil in one of said end zones, and wherein said magnetically conductive material has a face of substantially straight contour facing towards said axis of rotation.

13. The angle-of-rotation sensor of claim 12 wherein said axis of rotation is located outside an area which is covered by said magnetically conductive material.

14. The angle-of-rotation sensor of claim 1 wherein said magnetically conductive material at least partly surrounds said coil, and wherein said axis of rotation is located outside a space enclosed by said magnetically conductive material.

15. The angle-of-rotation sensor of claim 1 wherein in certain angular positions said overlapping area is formed while in other angular positions said overlapping area is not formed.

* * * * *